United States Patent
Wiemers

[19]

[11] Patent Number: 6,012,208
[45] Date of Patent: Jan. 11, 2000

[54] MACHINE TOOL SYSTEM

[76] Inventor: Karl-Heinz Wiemers, Lindenstrasse 2, D-39179, Ebendorf, Germany

[21] Appl. No.: 08/825,694

[22] Filed: Apr. 2, 1997

[30] Foreign Application Priority Data

Jul. 18, 1996 [DE] Germany ............................ 196 28 921

[51] Int. Cl.[7] ........................................... B23Q 1/25
[52] U.S. Cl. ............................ 29/33 P; 310/12; 409/219; 409/224; 414/749
[58] Field of Search ..................................... 29/33 P, 740; 74/89.15; 409/219, 225, 179, 221, 224; 310/12; 414/749

[56] References Cited

U.S. PATENT DOCUMENTS

| | | |
|---|---|---|
| 3,935,486 | 1/1976 | Nagashima .................. 310/12 |
| 4,591,306 | 5/1986 | Westerteicher et al. ................. 409/179 |
| 4,684,315 | 8/1987 | Sugishima ................................ 414/749 |
| 5,114,302 | 5/1992 | Meisser et al. ........................ 29/740 X |
| 5,196,745 | 3/1993 | Trumper ..................................... 310/12 |
| 5,524,499 | 6/1996 | Joffe ........................................ 74/89.15 |

*Primary Examiner*—William Briggs
*Attorney, Agent, or Firm*—Karl Hormann

[57] ABSTRACT

The invention relates to a novel machine tool system provided with selectively energizable magnets for selectively moving a support for a work piece clamping plate into a floating condition and for changing the disposition of the clamping plate relative to operating tools. The floating condition permits movement of the clamping plate substantially without frictional engagement between the clamping plate support and structure such as a machine bed on which the support is movably mounted.

17 Claims, 5 Drawing Sheets

MACHINE TOOL SYSTEM

BACKGROUND OF THE INVENTION

1. Field of the Invention

The invention relates generally to a machine tool system for processing symmetrical and asymmetrical work pieces and, more particularly, to an apparatus of the kind including magnetically controllable loading or positioning devices.

2. The State of the Art

Work pieces may be mechanically processed on machine tools such as lathes, milling machines or boring mills. Also, manufacturing systems are known utilizing CNC (computer numerical control) machine tools.

The incorporation of machine tools or even machine systems in assembly lines has become common practice for reducing idle times in mechanical processes to increase productivity and broaden manufacturing possibilities.

To meet these requirements, solutions have been proposed in respect of such operations as loading and unloading of work pieces on tool clamping plates and the like, the aligning of work pieces relative to tools, the adjustability of work pieces in process relative to a tool, as well as machine tool drives.

Thus, German laid-open patent specification DE-OS 2,102,234 relates to a drive for moving work piece supports to predetermined positions of a transport path within an assembly line.

This is accomplished by utilizing a plurality of primary and secondary components of well-known linear motors which cooperate reciprocally or by impulse excitations. The primary components are distributed in the transport path individually or in groups, and the secondary components are arranged on the tool support. Those components which are arranged in groups are disposed in parallel or angularly. Certain groups of primary components are alternatingly and consecutively connectible to three-phase-current and direct current sources by the tool support. Each of the secondary components consists of a plate of high magnetic conductivity facing the primary component and is covered by a plate of high electric conductivity, each one of which is longer than each of those primary components which are disposed in the same direction as they are. Two parallel strips of high magnetic conductivity are transversely embedded in the plate of high electric conductivity, each strip being wider than the width of the grooves of the primary components and the spacing of which, measured from their centers, corresponds to two dissimilar poles of the primary components.

In this apparatus, an air cushion is generated between the tool support and the transport path, and a known linear motor is used as a drive.

Setting up or lifting by means of a magnetic loading plate is also known, and European patent specification 0,357,904 A1 describes a magnetic loading plate capable of securely supporting not only work pieces made of different materials, even weakly or non-magnetic ones. Yet its surface structured such that even though support of the work piece is not lacking at any point, an assured and good vacuum transmission and unimpeded air flow is nevertheless possible.

Two embodiments are described. In one embodiment, slots and bores in the magnetic pole sections are formed between the pole conductors made of non-ferromagnetic material, and they are filled with fine-pored sintered metal. In the other embodiment, the slots are provided in the pole conductors and they are filled with fine-pored sintered metal as well, which in this case, however, is non-ferromagnetic.

Whilst with this proposed combined vacuum-magnetic loading plate retention by magnetic forces is possible, other possibilities such as, for instance, positioning or moving work pieces provided on the loading plate is not possible in accordance with this solution.

European patent specification 0,637,482 A1 discloses a method of positioning a tool support in a processing machine as well as an associate tool support, in which the work piece support is moved to, and is arrested in, a position corresponding to an approximate desired position, the actual position being thereafter determined by at least two reference marks provided on the work piece support. The work pieces clamped in the work piece support are then measured at a measuring location especially equipped for that purpose. The measurement data thus derived are transferred to the processing machine. The true position of the work pieces on the processing machine can then be calculated on the basis of the position of the two reference marks. Moreover, a tool support is proposed provided with at least two horizontally spaced reference marks for registering its position relative to the X and Y directions as well as its angular position around the Z axis.

Whilst this method does relate to positioning of a tool support in an processing machine, the realization of the method is very complex, the clamping elements provided serve to clamp and arrest the work piece support, whereby actual clamping is to take place mechanically, preferably by spring force, and release is to take place pneumatically.

The described known solutions relate exclusively to individual process steps or process sequences of machine tools. Combined or several continuously running operations are not possible with the said solutions.

OBJECTS OF THE INVENTION

It is an object of the present invention to provide a machine tool system for metal-cutting operations on symmetrical and non-symmetrical work pieces which allows for the reception of work pieces on clamping units within a system.

Another object of the invention resides in a machine tool system of the kind referred to which allows for positioning of work pieces relative to operating tools and their forward movement.

Still another object of the invention is to provide a machine tool system of the kind in which positioning of work pieces is accomplished by a CNC system controlling the operating tools, the magnetic lifting, drive and clamping forces as well as the mechanical advance movement. It is also an object of the invention to provide a machine tools system for mechanically processing of symmetrical and non-symmetrical work pieces wherein such work pieces may be received on clamping units.

Other objects will in part be obvious and will in part appear hereinafter.

SUMMARY OF THE INVENTION

In a preferred embodiment of the invention, these and other objects are accomplished by a machine tool for mechanically processing symmetrical and asymmetrical work pieces, including a movable receiving bed supported in a machine bed and provided with a divided and pivotal magnetic support ring receiving a clamping unit which may be magnetically clamped, lifted and moved and which is positionable in horizontal orthogonal directions.

In a preferred embodiment, the clamping unit is provided with a base plate, a clamping plate and a support ring provided therebetween.

Preferably, the base plate is spaced horizontally and vertically from the magnetic support ring and is movable relative thereto.

In yet another preferred embodiment magnetic clamping elements are provided on the loading surface of the receiving bed.

One or more vertically movable machine portals are provided for cooperation with the entire machine tool.

The machine tool system in accordance with the invention consists of a machine base including a machine portal operatively connected thereto. The machine portal is supported on both sides of the machine by the machine foundation and extends over the machine base. An arrangement in pairs of the machine portals is an element of the invention, the portals being arranged on both sides of the machine basis, extend over it, are each supported by the machine foundation and are provided with structures for receiving operating tools.

The machine base itself is provided with a bed member for receiving and guiding a clamping unit. The bed member is mounted for movement along the longitudinal axis, hereinafter sometimes referred to as the X-axis.

A magnetically supportable, clampable and positionable clamping unit is associated with the receiving bed. The clamping unit makes it possible to clamp work pieces to be received on a clamping plate, that the entire clamping unit may be lifted, moved and positioned as well as lowered by magnetic forces, and that it may be magnetically clamped, preferably by hybrid magnets, against the receiving bed.

In a preferred embodiment of the invention. The clamping unit is surrounded by a magnetic support ring which may be opened for receiving the clamping unit. Lifting and drive magnets are provided in the magnetic support ring.

The degree of freedom between the magnetic support ring and the base plate of the clamping unit as well as the degree of freedom between the magnetic support ring and the support ring of the clamping plate is selected to allow rotational and planar movement, as well as positioning of the entire clamping unit. Thus, horizontal movement and positioning of the entire clamping unit is ensured along the X and Y axes, as well as around its own Z axis, depending upon its required position relative to the operating tools.

Horizontal adjustment in the direction of the X axis is additionally provided by way of a main spindle provided in the receiving bed. The entire clamping unit with the work piece receiving bed may be moved along the X axis relative to the tool.

Horizontal adjustment in the direction of the Y axis is augmented by a magnetically supported transverse transport of the machine base.

It is another element of the invention that the machine portals may be moved the X axis as well as telescopingly along the Y axis relative to the entire machine tool system, and that, preferably, the machine base, except for the clamping plate, is arranged below the floor in a specially designed floor channel. Also, the machine tool system may be moved on the cross beam along the Z axis.

Depending upon the model and size of the machine base, the magnetic support ring is supported by predetermined support braces borne by the machine foundation, for instance, on rolls.

Hence, the machine tool system of the invention is characterized by the base modules of the receiving bed, a clamping unit consisting of a base plate, a support ring and a clamping plate, as well as a magnetic support ring connected to the receiving bed and which is surrounding the base plate of the clamping unit, is operatively connected to the clamping unit, and is pivotal.

Within the receiving bed, there are provided magnetic clamping elements, and the magnetic support ring is equipped with lifting and drive magnets.

Adjusting and positioning the clamping unit is carried out in its lifted, i.e., floating condition, since the lifting magnets are lifting the clamping unit off the receiving bed in such a manner that air gaps are provided between these two components as well as between the base plate and the magnetic support ring. Positioning operations are thus carried out free of any physical contacts.

DESCRIPTION OF THE SEVERAL DRAWINGS

The novel features which are considered to be characteristic of the invention are set forth with particularity in the appended claims. The invention itself, however, in respect of its operating steps and the sequence thereof, and the structure, construction, and lay-out, as well as manufacturing techniques involved in apparatus for practicing the invention, together with other objects and advantages thereof, will be best understood from the following description of preferred embodiments when read in connection with the drawings, in which:

DETAILED DESCRIPTION OF PREFERRED EMBODIMENTS

Figure 1:
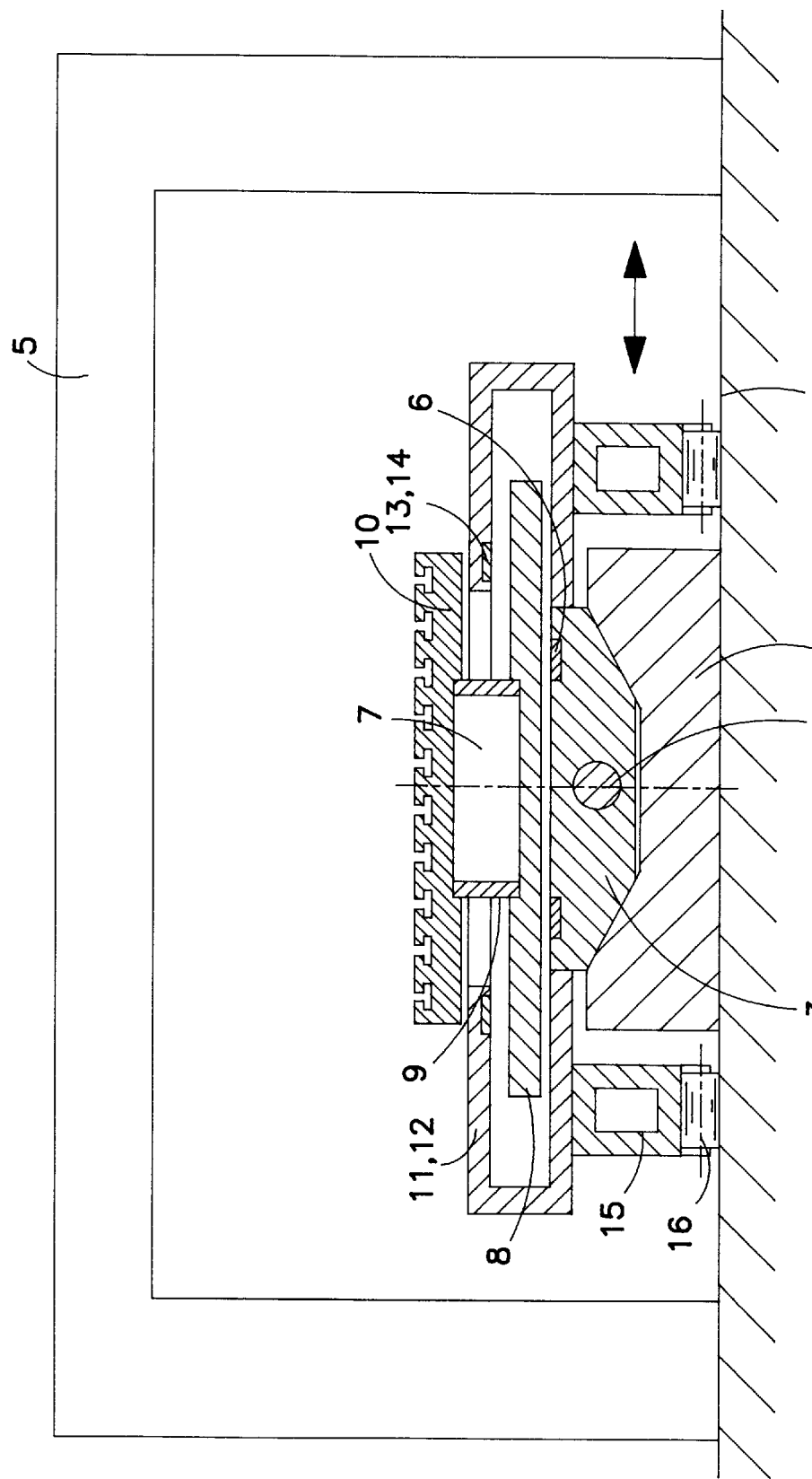
FIG. 1 is a schematic representation in partial section of a machine tool system in accordance with the invention.

FIG. 1 offers an total schematic view of the machine tool system. As may be seen from FIG. 1, the type of machine tool shown is a milling machine or a boring mill.

The base of the machine is structured as a machine bed 1 which is supported on a floor or foundation 2. The machine bed 1 may be moved with magnetic support on rails 20 (FIG. 2) extending along either side of the machine. In its upper surface, the machine bed 1 is provided with a special recess within which a receiving bed 3 may be supported and moved. A threaded spindle 4 is provided within the receiving bed 3, and by rotating the spindle 4 the bed 3 is moved longitudinally of the machine system, i.e. normal to the plane of the drawing of FIG. 1. The direction of such movement will hereinafter from time to time be referred to as the X axis of the machine. Rotation of the spindle 4 is generated by conventional drive means (not shown).

One or more machine portals 5 (only one shown) are provided and extend over the machine tools system. They are mounted on the foundation 2 and may be telescopingly moved with magnetic support on the rails 20 in the Y direction of the machines, i.e. normal to the X axis. The machine portals 5 are provided with brackets or the like (not shown) for mounting operating tools which for the sake of simplicity, and because they form no direct element of the present invention, have not been shown either.

The receiving bed 3 module is provided on its upper or clamping surface, i.e. the surface opposite its sliding surfaces facing the machine bed 1, with clamping elements 6. Preferably, the clamping elements 6 are hybrid magnets, which function similarly to a combination electric and permanent magnet.

The second basic module of the machine tool system in accordance with the invention is a magnetically supported clamping unit 7. The clamping unit 7 consists of a base plate 8, a carrier collar 9 and a clamping plate 10.

In FIG. 1, the clamping unit 7 is shown in a floating state. It is depicted in this condition so that the individual elements of the system may be clearly apparent. In practice, while in operation, the entire clamping unit 7 rests upon the receiving bed 3, and during movements or position adjustments it is maintained in its floating condition by a magnetic retaining ring 11. In fact, the retaining ring 11 constitutes a third module of the system and is seen to form an annular chamber for purposes to be described.

The clamping plate 10 is provided with longitudinal and transverse clamping grooves of the kind well known in the art and may be exchanged to suit particular work pieces. Work pieces to be processed may be directly or indirectly clamped on the clamping plate 10 and may be clamped thereon either within the machine tool system or outside of it. In the latter case, either the entire clamping unit 7 or, in an alternative embodiment, the clamping plate 10 is removed from the machine tool system in the manner of a work piece pallet. After a work piece has been deposited on it the clamping unit 7 or clamping plate 10, as the case may be, may be returned to the machine tool system.

The magnetic retaining ring 11 is connected to the receiving bed 3 and extends radially beyond the base plate 8 of the clamping unit 7. In fact, the coaxial chamber formed in the retaining ring 11 encloses the base plate 8 in coaxial relationship. The base plate 8 and the chamber are respectively dimensioned such that a defined uniform vertical space and a radial gap are maintained between the base plate 8 and the magnetic retaining ring 11.

A defined space or gap is also provided between the upper portion 12 of the magnetic retaining ring 11 and the circumference of the carrier collar 9. Hence, sufficient degrees of freedom or play are provided to ensure that the entire clamping unit 7 may at any time be moved and positioned to accommodate tooling or operational requirements.

Lifting magnets 13 and driving magnets 14 facing the base plate 8 are provided in an upper portion of the retaining ring 11 in a substantially annular alternating sequence.

In the embodiment shown in FIG. 1, the machine tool system including its clamping unit 7 and magnetic retaining ring 11 is supported on the foundation 2 by support pillars 15 depending from the lower surface of the retaining ring 11 and being provided at their opposite ends with rollers 16 engaging the foundation 2. Such an arrangement represents an additional support having a positive effect on an entire operational cycle.

Figure 2:
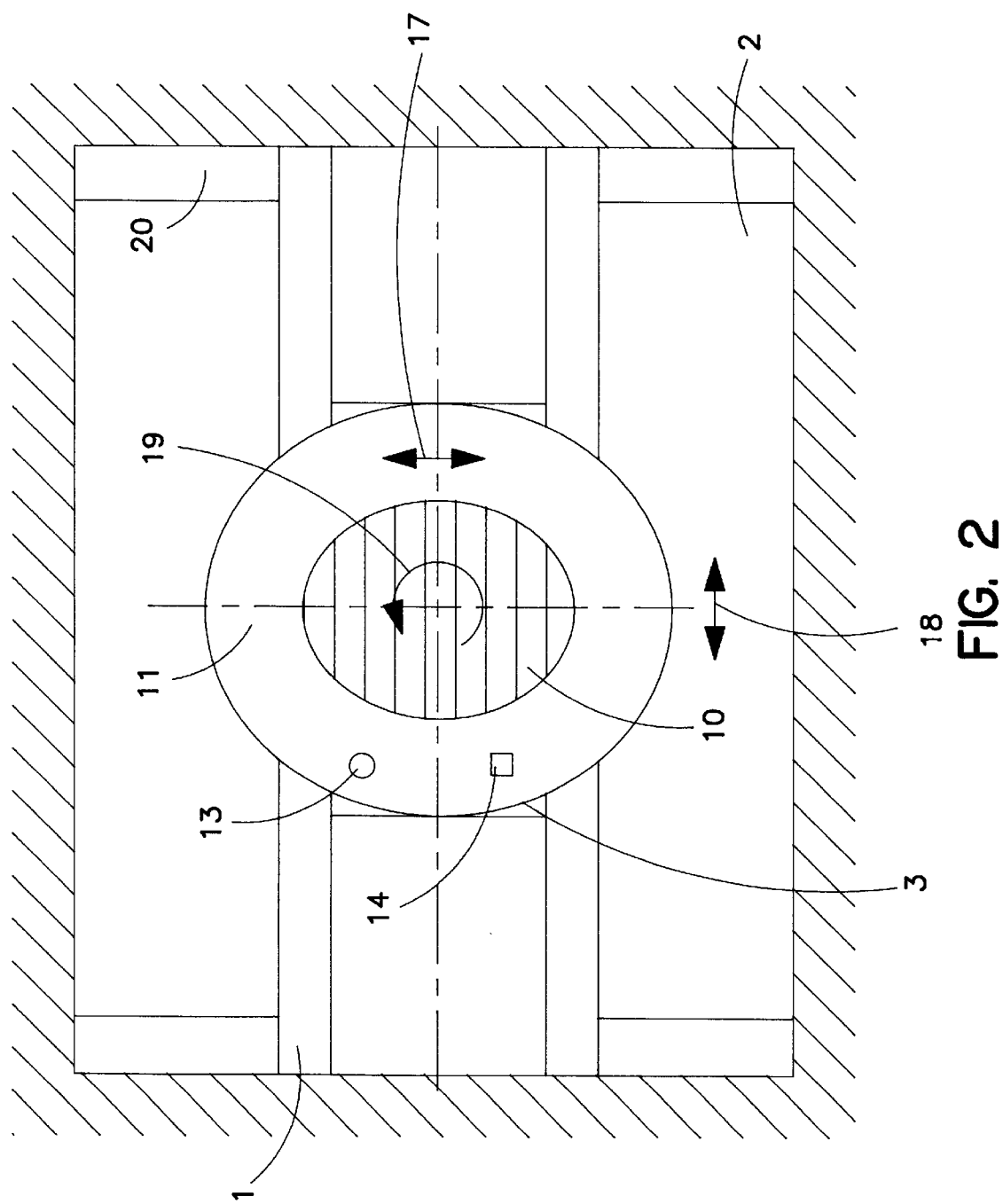
FIG. 2 is a top elevation of the apparatus of FIG. 1.

The configuration and disposition of the clamping plate 10 relative to the magnetic retaining ring 11 is schematically depicted in FIG. 2, wherein arrow 17 indicates the X axis or direction and 18 represents the Y axis or direction. Rotationally symmetric adjustments of the entire clamping unit 7 are indicated by arrow 19 indicating rotational movement of the clamping unit 7 about its own or Z axis.

FIG. 2 also indicates that the entire machine base 1 may be provided with rails 20 along which the machine base 1 may be moved with magnetical support relative to the machine portals 5.

The alternating annular disposition of the lifting magnets 13 and of the drive magnets 14 is shown in FIG. 2. The magnets 13, 14 are placed alternatingly and preferably concentrically with respect to the Z axis around the magnetic retaining ring 11 and serve at times to lift and horizontally move or rotate the entire clamping unit 7, i.e. base plate 8, carrier collar 9 and clamping plate 10 as described supra.

The base plate 8 may be made of various materials, but it will be understood that at least part of the material must be magnetic.

As indicated in FIG. 1 by a dashed line which is intended to represent an alternative floor, the machine system including the machine bed 1, the receiving bed 3 and the retaining ring 11 may be mounted in an appropriately configured elongate pit or channel so that only the clamping plate 10 extends upwardly out of the floor.

DESCRIPTION OF THE OPERATION

For placing and clamping work pieces on the exchangeable clamping plate 10, the receiving bed 3 is driven out of the effective range of the machine portal or portals 5 by rotation of the threaded spindle 4.

Owing to the variability or adjustability of the entire system including the work pieces clamped on the clamping plate 10, the work piece to be processed may, depending upon technological demands, be successively positioned relative to the respective tools mounted on the machine portals 5.

In its operative state, the clamping unit 7 will be in its lowered position, i.e. the base plate 8 is placed in intimate contact with the lower internal surface of the retaining ring 11 and the receiving bed 3 and is clamped thereagainst by the magnetic clamping elements 6 mounted in the receiving bed 3.

The clamping unit 7 may be raised by changing the state of the clamping elements 6 which are preferably constituted by hybrid magnets, such that their magnetic force approaches 0. At the same time, the lifting magnets 13 are activated, and the entire clamping unit 7 is put into a floating state by controlling the movement of the base plate 8 within the upper and lower limits of the chamber defined by the magnetic retaining ring 11.

Rotational adjustment of the clamping unit 7 around the Z axis, in the direction of arrow 19, may thereafter be brought about by energization, preferably in a predetermined sequence, of the drive magnets 14 mounted in the upper portion 12 of the magnetic retaining ring 11. Such energization leads to a circumferential and planer adjustment in the disposition of the clamping unit 7. As soon as a desired position has been reached, the state of the lifting and drive magnets 13, 14 is reversed, the clamping magnets 6 are polarized thus lowering the clamping unit 7 and clamping it against the receiving bed 3 in its new orientation.

The individual magnets use may be controlled such that on the ferromagnetic pulling forces of the lifting magnets 13, for instance, will form and maintain an air gap between the upper portion 12 of the magnetic retaining ring 11 and the base plate 8. In like manner, an air gap will be established between the base plate 8 and the lower portion of the magnetic retaining ring 11 adjacent to the receiving bed 3.

Location and structure of the magnets used ensure the efficiency of the magnetic forces. Thus, the floating clamping unit 7 may be horizontally and rotationally moved and repositioned without either additional motion-imparting elements such as toothed racks, pinions, threaded spindles, linear motors or the like, or additional media such as pneumatic or hydraulic pressure or the like.

The significant advantages of the solutions offered by the invention result, not least, in a reduction of processing times on machine tools, since the time otherwise needed to set up the machines has been substantially shortened owing to the ability quickly to position or align the work pieces. Instead of requiring additional devices, releasing and clamping of work pieces are accomplished exclusively by magnetic forces. Since repositioning movements take place substantially without any physical contacts, no lubricants are needed between the base plate 8 and the receiving bed 3. Also, repositioning movements are executed without any wear and tear on the modules, thus resulting in a quieter operation and longer life of the machine tool system.

A further advantage of the machine tool system proposed by the invention resides in the fact that the clamping plate 7 is exchangeable, i.e. it may be removed from the system and positioned in another similarly programmed machine system in which positional adjustments are executed by a similar programming system. The possibility of removal and insertion of the clamping plate into another machine tool system such as, for instance, a robot system, a further mechanical processing unit or a surface coating unit are indicative and characteristic of the flexibility of the proposed solution and its superiority over prior complex machine systems. They render the machine tool system of this invention imminently suitable for application in transfer assembly lines.

The following description referring to FIGS. 3–8, relates to an alternative embodiment of a magnetic retention ring 11. Like reference numerals will be used for like elements of the embodiment described above.

The retention ring is shown as a double magnetic ring 11, 12. The base plate 8 is mounted, and the lifting magnets 13 and the clamping magnets 6 are arranged in the upper member of the magnetic retention ring 11, 12. A rotor plate 15 and the drive magnets 14 are arranged in the lower member of the magnetic retention ring 11, 12, the drive magnets being placed above as well as below the rotor plate 15.

Figure 3:
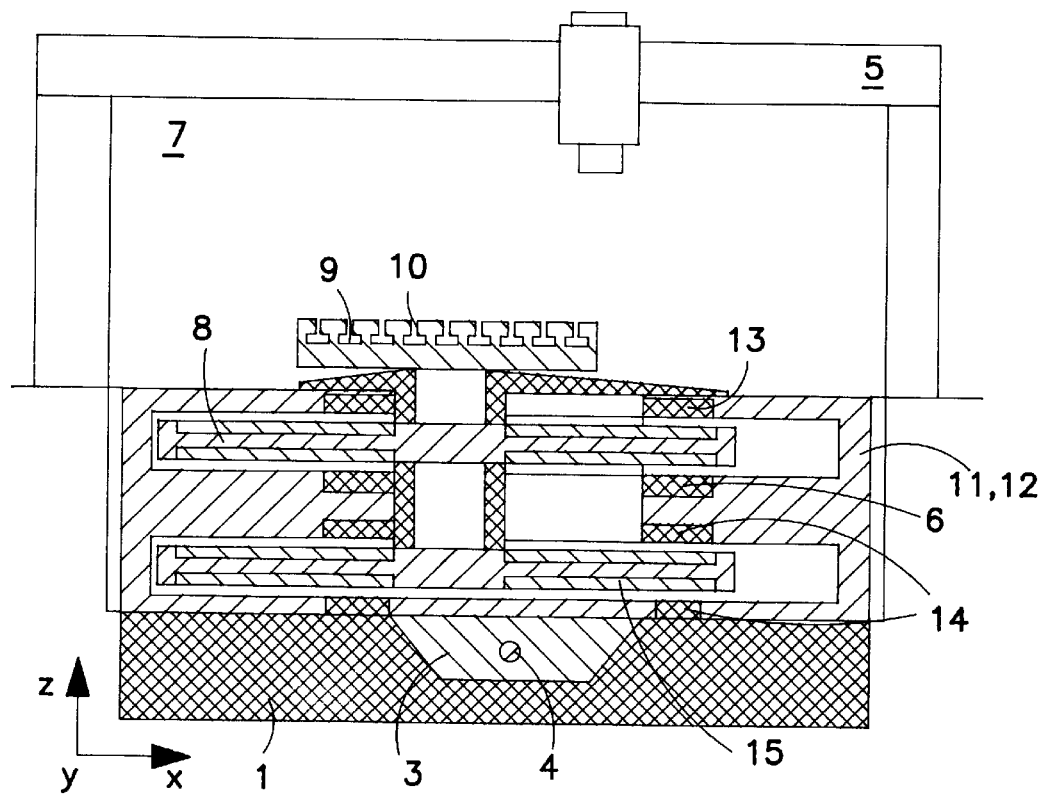
FIG. 3 depicts the structure of the magnetic retaining ring as a double magnetic ring.
Figure 4:
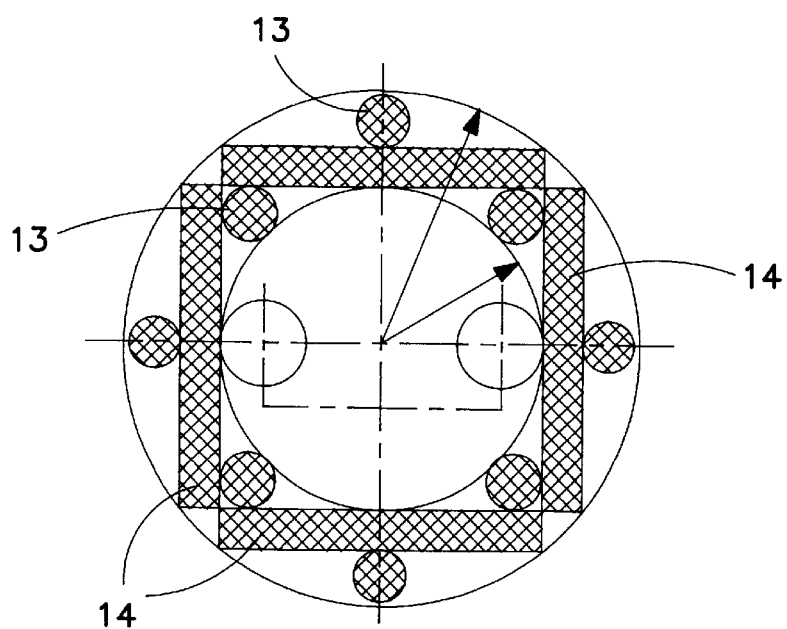
FIG. 4 depicts the magnetic retaining ring in combination with lifting and clamping magnets and drive magnets.

The combination of lifting and clamping magnets 13, 6 and of the drive magnets 14 may be seen in FIG. 2 which depicts the upper member of the magnetic retention ring 11, 12, i.e. the lifting magnets 13 are shown in an alternating sequence and are schematically depicted in FIGS. 3 and 4. FIG. 4 depicts the disposition of the lifting magnets 13 and of the drive magnets 14.

Figure 5:
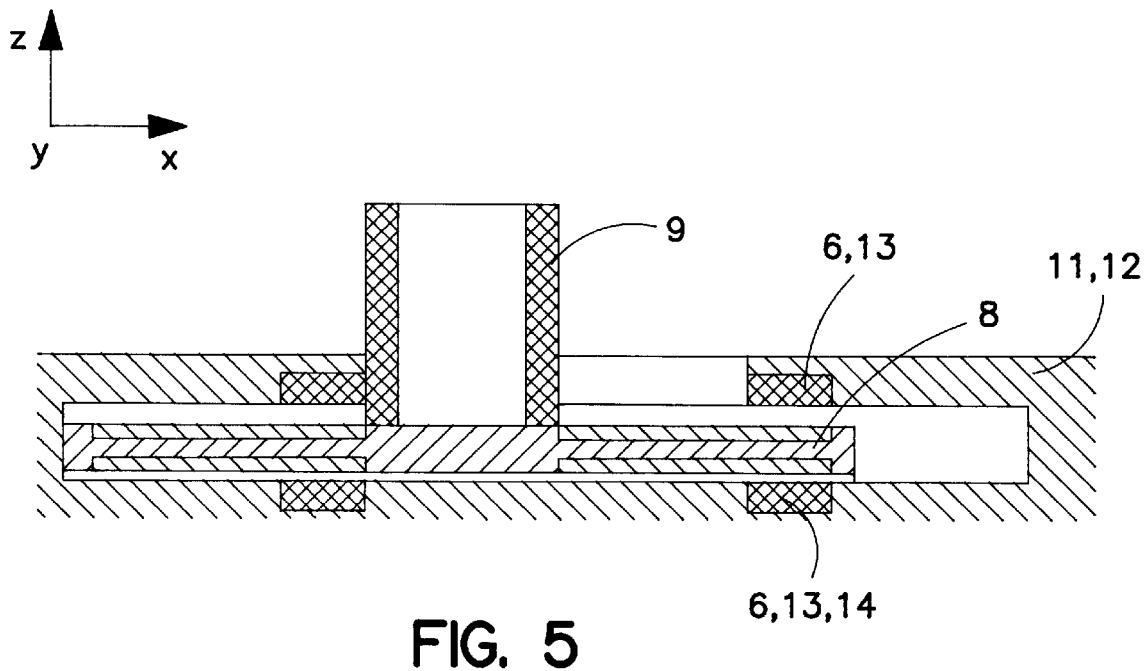
FIG. 5 depicts the principle of complete magnetic coverage of the base plate in connection with combined lifting and clamping magnets and drive magnets.
Figure 6:
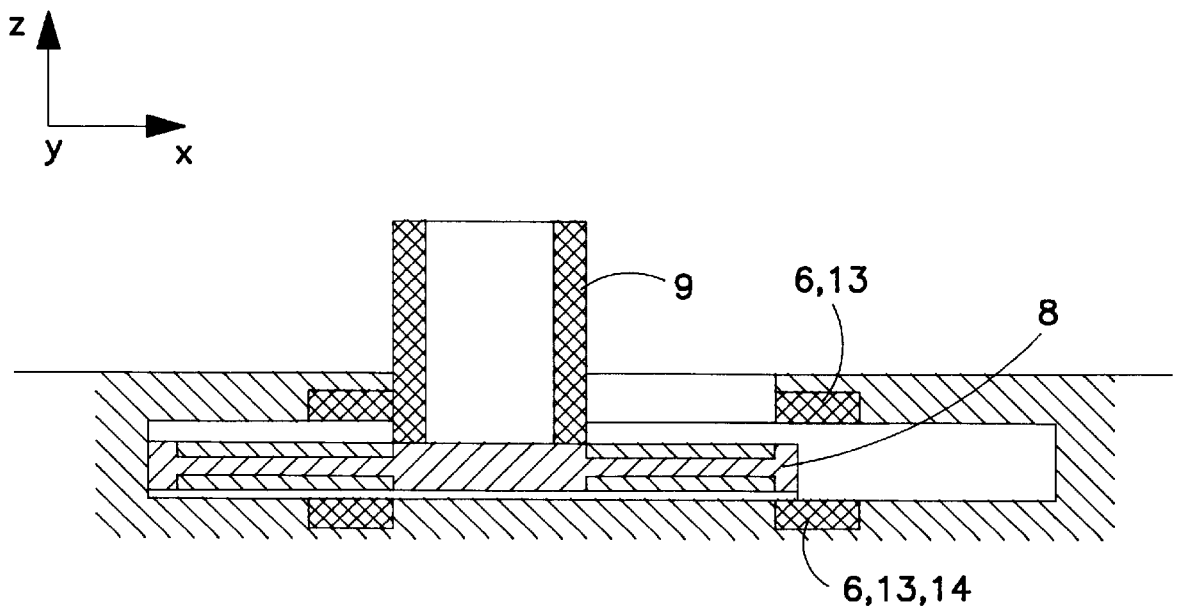
FIG. 6 depicts the principle of partial magnetic coverage of the base plate in connection with combined lifting and clamping magnets and drive magnets.

The presentation of the arrangement of the base plate 8 relative to the combined lifting and clamping magnets 13, 6 as well as to the drive magnets 14 may be seen in FIGS. 5 and 6. This arrangement serves to position work pieces on the clamping plate 10 in a rotational and planar floating condition.

This is accomplished by the drive magnets 14, and after the base plate 8 has been lowered, it will be secured against shifting by the clamping magnets 6.

Figure 7:
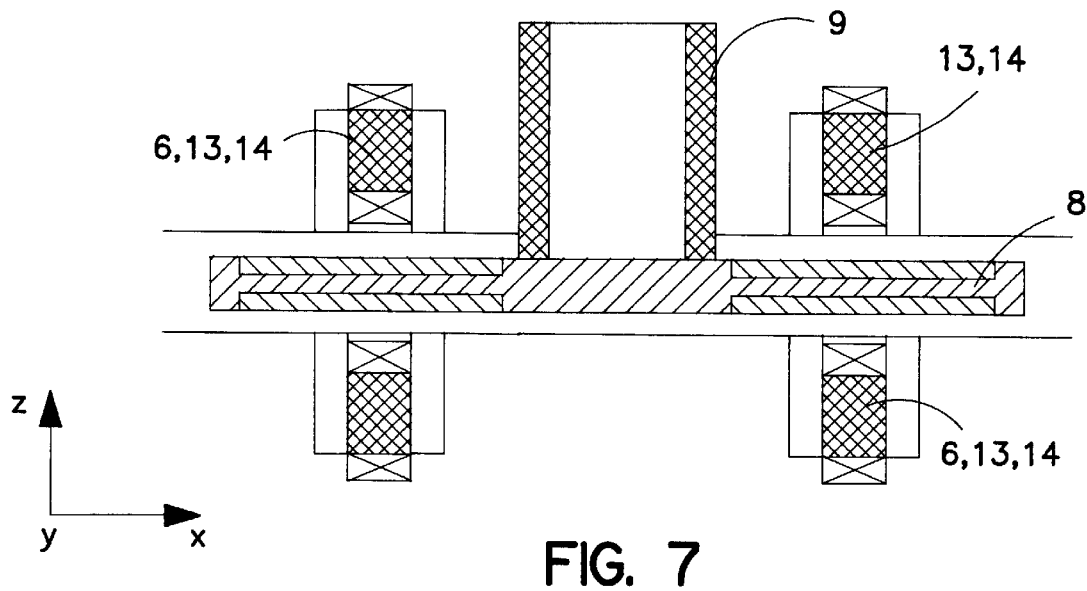
FIG. 7 depicts the principle of a combined base and rotor plate.

FIG. 7 shows the manner in which individual clamping, drive and lifting magnets 3, 13, 14 may be positioned. This may be accomplished by selecting a combination of lifting and drive magnets 13, 14 arranged above the base plate 8; whereas a combination of drive magnets 14, lifting an clamping magnets may be provided below the base plate 8.

Figure 8:
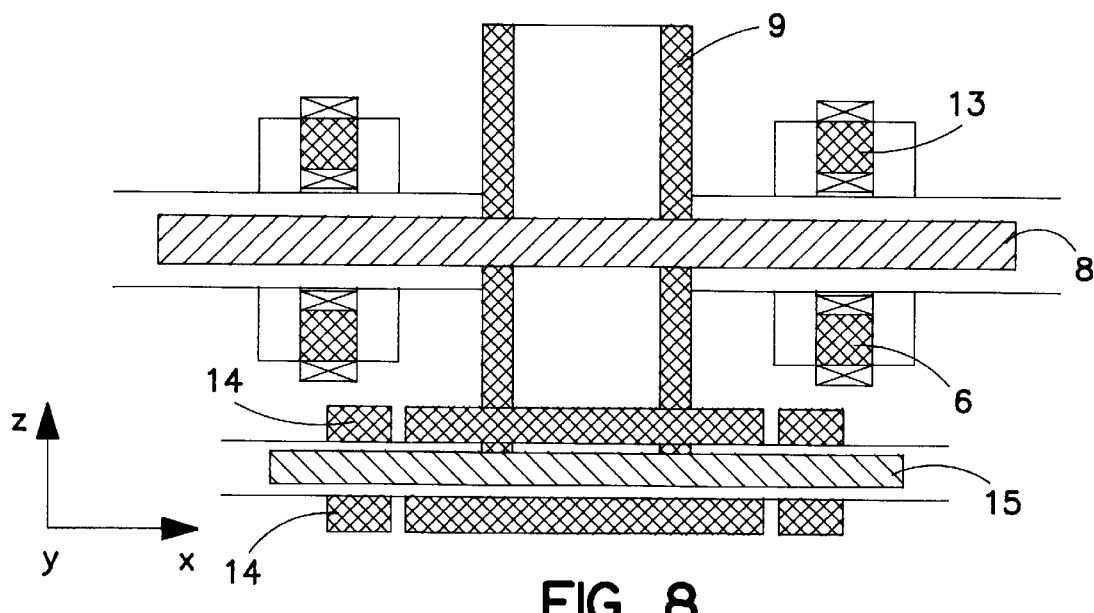
FIG. 8 depicts the principle of separate base and rotor plates.

FIG. 8 schematically depicts the disposition of the lifting magnets 13 and the clamping magnets 6 relative to the base plate 8. It also indicates the manner in which the base plate 8 may be driven by a rotor plate 15. To this end, the rotor plate 15 which is connected to the base plate 8 and to the carrier collar 9, is lifted by the magnets 13 and thereafter it is driven by the drive magnets 14. The drive magnets 14 are structured as linear motors. Once an appropriate repositioning or adjustment has been attained, the base plate 8 and the rotor plate 15 are lowered, and the base plate 8 is clamped in its position by the clamping magnets 6.

What is claimed is:

1. An apparatus for mechanically processing symmetric and asymmetric workpieces, comprising:

means for forming a bed having an elongate channel therein extending in a predetermined direction;

receiving means mounted in the channel for selective movement relative to the direction;

chamber forming means positioned on the receiving means and comprising a circular wall member of predetermined height and at least upper and lower members integral with the wall member for forming at least one substantially circular chamber provided with a first axial opening of predetermined diameter;

a magnetically responsive base plate member mounted in the annular chamber for selective axial and rotational movement therein;

means for forming a selectively energizable magnetic drive for axially moving the base plate member in the chamber between a first position in which it is in engagement with one of the at least upper and lower annular members and a second position in which it is located intermediate the at least upper and lower annular members and for selectively rotating the base plate member when it is in its second position; and means extending from the base plate member through the opening for supporting means outside of the chamber for selectively securing workpieces.

2. The apparatus of claim 1, wherein the magnetic drive comprises a plurality of first magnets in at least one of the receiving means and the chamber forming means, the fist magnets being switchable between a first state in which the base plate member is arrestingly engaged by the lower annular member and a second state in which the base plate member is released from the engagement therewith.

3. The apparatus of claim 1, wherein the magnetic drive further comprises a plurality of second magnets disposed in one of the chamber forming means and the base plate member, the second magnets being switchable between a first state in which the bases plate is arrestingly engaged by one of the upper and lower members and a second state in which the base plate member is released from the engagement therewith.

4. The apparatus of claim 3, wherein the first and second magnetic means are switched to assume their first state substantially simultaneously.

5. The apparatus of claim 4, wherein in its second state at least one of the first and second magnetic means is energized to put the base plate member in a substantially floating state intermediate the lower and upper members.

6. The apparatus of claim 5, wherein the magnetic drive further comprises energizable third magnets disposed in one of the chamber forming means and the base plate means for imparting selective rotational movement to the base plate member.

7. The apparatus of claim 6, wherein the third magnets are energizable when the base plate member is in its floating state.

8. The apparatus of claim 7, wherein the second and third magnet are arranged in alternating sequence around the first opening.

9. The apparatus of claim 2, wherein the first magnets are hybrid magnets.

10. The apparatus of claim 1, further comprising means for forming at least one portal disposed in a vertical plane disposed normal to the predetermined direction for supporting tools for alignment relative to the workpieces.

11. The apparatus of claim 1, further comprising means for forming a channel having an upper margin for receiving the bed, the receiving means and the chamber forming means in a disposition in which the upper member is disposed within the upper margin.

12. The apparatus of claim 1, further comprising means for moving the bed in a direction substantially normal to the predetermined direction.

13. The apparatus of claim 6, wherein the means extending from the base plate member comprises a first component having upper and lower sections and a second component axially displaced therefrom, the first and second magnets being associated with the first component and the third magnets being associated with the second member.

14. The apparatus of claim 13, wherein the chamber forming means comprises a third member disposed intermediate the upper and lower members and provided with an axial second opening therein, the third member providing a second annular chamber axially displace from the first chamber.

15. The apparatus of claim 14, wherein the base plate member comprises first and second axially displaced sections disposed in the first and second chamber, respectively.

16. The apparatus of claim 15, wherein the magnetic drive comprises first and second selectively actuable magnets in one of the first and second chambers for axially moving the base plate member between a first position in which it is secured against movement and a second position in which it is released and third selectively actuable magnets in the other of the first and second chambers for selectively rotating the base plate member when it is released.

17. The apparatus of claim 16, wherein the first and second openings and the means extending from the base plate member are dimensioned to provide for lateral movement of the base plate member.

* * * * *